United States Patent [19]

Erickson

[11] Patent Number: 4,515,223

[45] Date of Patent: May 7, 1985

[54] HAND OPERATED WEEDING DEVICE WITH OPERATING DEPTH STABILIZER PLATE AND WEED DISPLACER STRIP

[76] Inventor: Wade A. Erickson, 120 E. 3rd St., Box 125, Yankton, S. Dak. 57078

[21] Appl. No.: 524,901

[22] Filed: Aug. 22, 1983

[51] Int. Cl.³ .............................................. A01B 1/16
[52] U.S. Cl. ..................................... 172/372; 172/371
[58] Field of Search ............... 172/371, 372, 375, 381, 172/517; 294/49, 50, 50.6, 55; D8/7, 10, 11; 254/131.5, 132

[56] References Cited

U.S. PATENT DOCUMENTS

| | | | |
|---|---|---|---|
| 91,564 | 6/1869 | Rice | 294/51 X |
| 337,602 | 3/1886 | McBride | 294/49 |
| 396,856 | 1/1889 | Brown | 172/381 |
| 479,661 | 7/1892 | Poulson | 294/49 |
| 481,972 | 9/1892 | Poulson | 294/49 |
| 1,739,489 | 12/1929 | Wagner | 172/381 |
| 2,134,070 | 10/1938 | Avant | 172/371 |
| 2,343,616 | 3/1944 | Kay | 172/375 |

FOREIGN PATENT DOCUMENTS

| | | | |
|---|---|---|---|
| 529504 | 7/1931 | Fed. Rep. of Germany | 172/375 |
| 438863 | 3/1912 | France | 294/49 |

Primary Examiner—Richard T. Stouffer

[57] ABSTRACT

A hand operated weeding device. The device is used in weeding such places as flower beds and vegetable gardens. It comprises a weed displacing structure composed of sections which have multiple functions. One section, when operated under the surface of the soil, is used as a self stabilizer of its operating depth in the soil; it crumbles the soil it passes under, the soil being around the top sections of the cut off weed roots; and it has a forward cutting edge. A second section further crumbles soil around this top part of the roots and pushes most of these root parts with attached weed tops out of the soil and pushes them all away. Weeds cut off on the surface of the ground are also pushed away.

2 Claims, 3 Drawing Figures

HAND OPERATED WEEDING DEVICE WITH OPERATING DEPTH STABILIZER PLATE AND WEED DISPLACER STRIP

The present invention is generally related to hand operated weeding devices having one cutting edge and is more particularly concerned with hand operated weeding devices having all parts stationary in respect to each other while the devices are used in weeding during forward thrusts.

BACKGROUND OF THE INVENTION

At the present time forward thrust single bladed weeding devices are used to cut weed stems right on the surface of the ground or cut weed roots in the soil in an attempt to eradicate weeds. These weeding devices, when thrust forward, leave weeds laying in such a way as to obscure the edge of the weeded area, especially when the weeds are of the vine kind growing close to the ground. This edge obscurity causes weeds to be missed while weeding. In order to avoid missing the weeds extra time has to be taken to discriminate between weeded and unweeded areas during the weeding time. When operating in the soil, these weeding devices also leave the cut off sections of weed roots in the soil. Weeds left with this part of its root in the soil can make the weeding attempt a transplanting operation instead, especially when rain falls on the weeded area shortly after the weeding is finished. Raking or lifting weeds away in order to clear the weeded area and/or move weed root sections out of the soil takes extra time.

The present invention overcomes these problems. First, it shoves the weeds away so that the weeded area edge is clearly seen while also moving most severed weed root parts clear of the soil. The good visibility of weeded area edges eliminates extra time needed to determine the edge of the weeded area. Secondly, the rapidity of weeding with this invention makes subsequent weedings faster than raking. Thus the raking motion or process is not needed and time is saved.

Weeding in the soil is made easier by the use of the stabilizer in keeping the section of this invention that operates in the soil near the surface of the ground during the forward motion, which also makes for effective weed and soil separation by minimizing the amount of soil to be separated from the cut weed parts. Of the weeding devices in this category, this invention is most advantageous for a person with impaired legs to use when weeding while a section of this invention is operated under the soil's surface.

SUMMARY OF THE INVENTION

The present invention is a device to be used in weeding. The invention is hand activated by means of an attached handle.

One objective of the invention is to provide a means that stabilizes depth in the soil at which it is operated. The said stabilizing means being a flat plate which has one cutting edge with the handle being attached to the opposite edge at an angle that causes a vertical distance to exist between the end of the handle and the ground when the stabilizing plate is shoved forward on the surface of the ground or in the soil. With the further provision that the plate area between the cutting edge and the end to which the handle is attached be great enough so that when the plate is tilted upward in the soil it slides promptly up when being shoved ahead, with the distance at which the end of the handle is held from the ground controlling the tilt of the stabilizing plate and consequently the depth in the ground at which it operates. With the stabilizing plate being pushed deeper into the soil when it is tilted downward from the handle end and sliding up out of the soil when it is tilted upward from the handle end, with intermediate positions of the handle being varied according to the operating depth desired as the invention is shoved forward.

A further objective of the invention is the provisions of a means which shoves weeds and attached cut off root tops out of the soil in most part and shoves them away or shoves weeds away that have been cut off at the surface of the soil, said means being called a weed displacer, the weed displacer being a flat metal strip extending forward from where, at a short distance above the stabilizing plate, it is bolted down with adjustment provisions, and is bent down at an angle that causes the end of the weed displacer to touch the stabilizing plate a short distance from the cutting edge of the stabilizer, this distance being adjustable by means of the adjustment provisions. With the part of the weed displacer touching the stabilizer operating in the soil when the stabilizer is operated in the soil.

An additional objective of the invention is the provision of a means by which the handle and weed displacer are attached to the stabilizing plate, this attachment means being composed of short rods attached to the stabilizing plate, one rod being vertically attached near the edge of the stabilizing plate opposite the cutting edge, a second rod vertically attached to the stabilizer at a place a little nearer the cutting edge, and a third rod attached to the top edge of the second rod at an angle that causes it to touch the stabilizer and be attached to it at a point a little closer still to the cutting edge, said rods being centered between the two sides that extend back from the ends of the cutting edge of the stabilizer, with a metal strip attached to and centered on the tops of the rods with its ends being flush with the opposite sides of the rods, said metal strip being called a platform and which has a hole in it for a bolt which fastens the weed displacer to the platform, which is a short distance above the stabilizer. The handle shank is attached parallel to the outer edge of the upright rod furthest from the cutting edge, with the shank extending upward vertically, and bent backward at a place a short distance above the attached part, it being bent so that it extends backward and upward, providing the angle with which the handle extends from the stabilizing plate. Thus provision is made for the attachment of the weed displacer to the stabilizing plate at a point above it and so putting it in a suitable position to perform properly.

A still further objective of the invention is to provide a means of loosening dirt around the cut off roots of weeds and also to keep the stabilizing plate clear of weeds while it is being shoved forward. The soil the stabilizer passes under is crumbled by the stabilizer being made long enough to cause this process to take place. The soil is further loosened around the root parts and they are generally shoved clear by the weed displacer as it is shoved against the weeds. Weeds are kept off the stabilizer by setting the weed displacer section that touches the stabilizer at the right distance back of the cutting edge on the stabilizer. To keep weeds with root clusters from riding up on the weed displacer and falling on the stabilizer, the weed displacer is set back a distance from the cutting edge. For weeds with straight tap roots, the weed displacer can be set closer to the cutting edge in order to keep the stabilizer clear of weeds as it is shoved forward during the weeding process.

BRIEF DESCRIPTION OF THE DRAWING

Other objects and advantages of the invention will become more apparent from the specifications taken in conjunction with the accompanying drawings, in which.

DETAILED DESCRIPTION OF THE DRAWING

Figure 1:
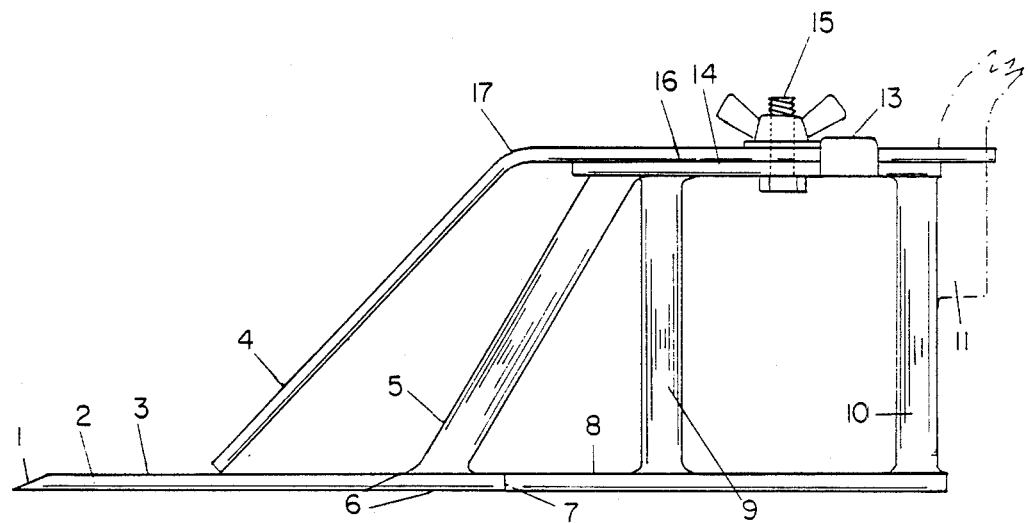
FIG. 1 is a side view which emphasizes the top section of the invention.
Figure 2:
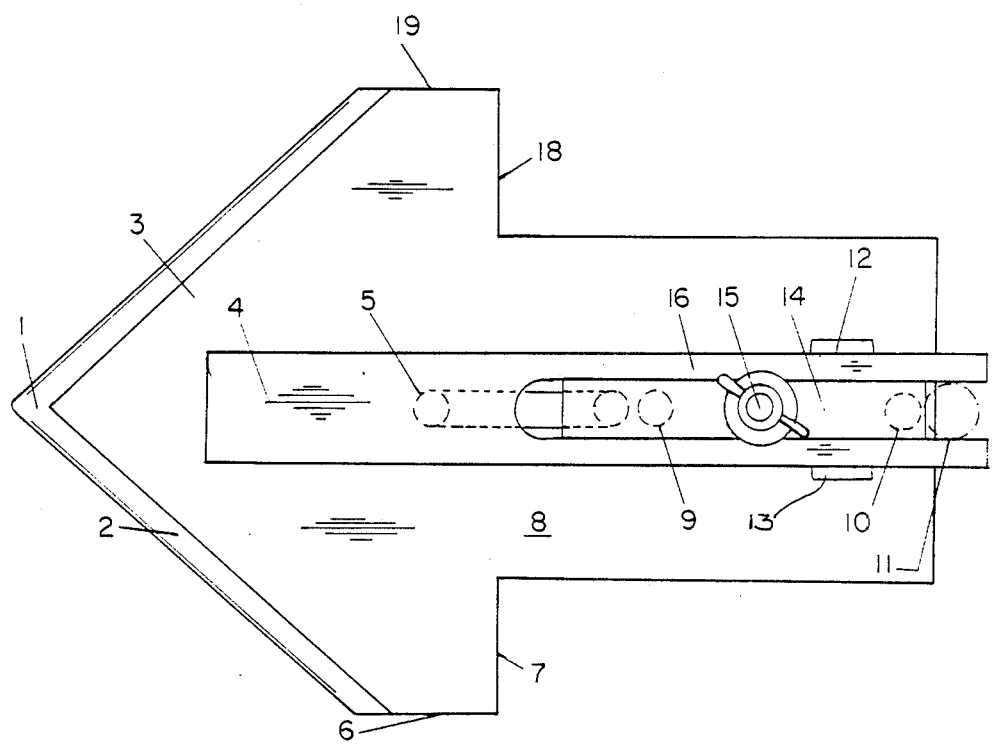
FIG. 2 is a top view which accents the bottom section of the invention while giving some detail regarding the top section.

Referring to the drawing shown on FIG. 1, numerals 1, 2, 3, 6, 7, and 8 refer to portions of the bottom section and will be taken up in the discussion of FIG. 2. Numerals 5, 9 and 10 are mild steel rods welded to the bottom section, with the top of rods 5, 9 and 10 welded to a flat mild steel plate 14. Numeral 11 indicates the handle shank made of carbon steel which is welded to rod 10. Rod 5 is a support brace serving to keep this section strong enough to receive the working force exerted through the handle. Plate 14 supports bent flat mild steel strip designated by numerals 4 and 16 and which is bent at the place designated by numeral 17. Numeral 15 designates the bolt, washer and wing nut all made of carbon steel except the washer which is mild steel, and which, together with 13, a mild steel guide, holds metal strip 4 and 16 in place. The place soft steel strip 4 touches the bottom section of the invention can be adjusted forward or backwards as shown in FIG. 2.

In FIG. 2, numerals 1 and 2 designates the cutting edge of plate 3, said plate being made of carbon steel which ends at a line designated by numerals 7 and 16 where mild steel plate 6 is welded to plate 3. The end of mild steel strip 4 nearest cutting edge 1 and 2 can be moved nearer to or further away from said cutting edge by loosening bolt 15 and sliding the strip 4 either forward or backward as allowed by the slot in the strip 4 section indicated by numeral 16. It then is held in place by tightening bolt 15 and also by mild steel guides 12 and 13. The slot in metal strip 4 at section 16 allows it to slide past the handle shank 11.

Plate 3 has shoulders 6 and 19 which are back of cutting edge 1 and 2 in order to allow for a number of sharpenings before plate 3 begins to narrow down because of loss of surface caused by sharpening. The combined length of the bottom plate sections indicated by numerals 3 and 6 is sufficient to cause soil it passes under to crumble when shoved forward under but near to the surface of the ground. This serves the purpose of loosening dirt around the cut off section of weed roots. A shorter bottom plate disturbs the soil less. This length of the bottom section 3 and 6 plus its width provides enough surface to cause the bottom plate 3 and 6 to slide upward promptly when the cutting edge is raised upward during the forward motion. A shorter bottom section does not respond as well to the upward tilt, which is brought about by lowering the end of the handle.

Figure 3:
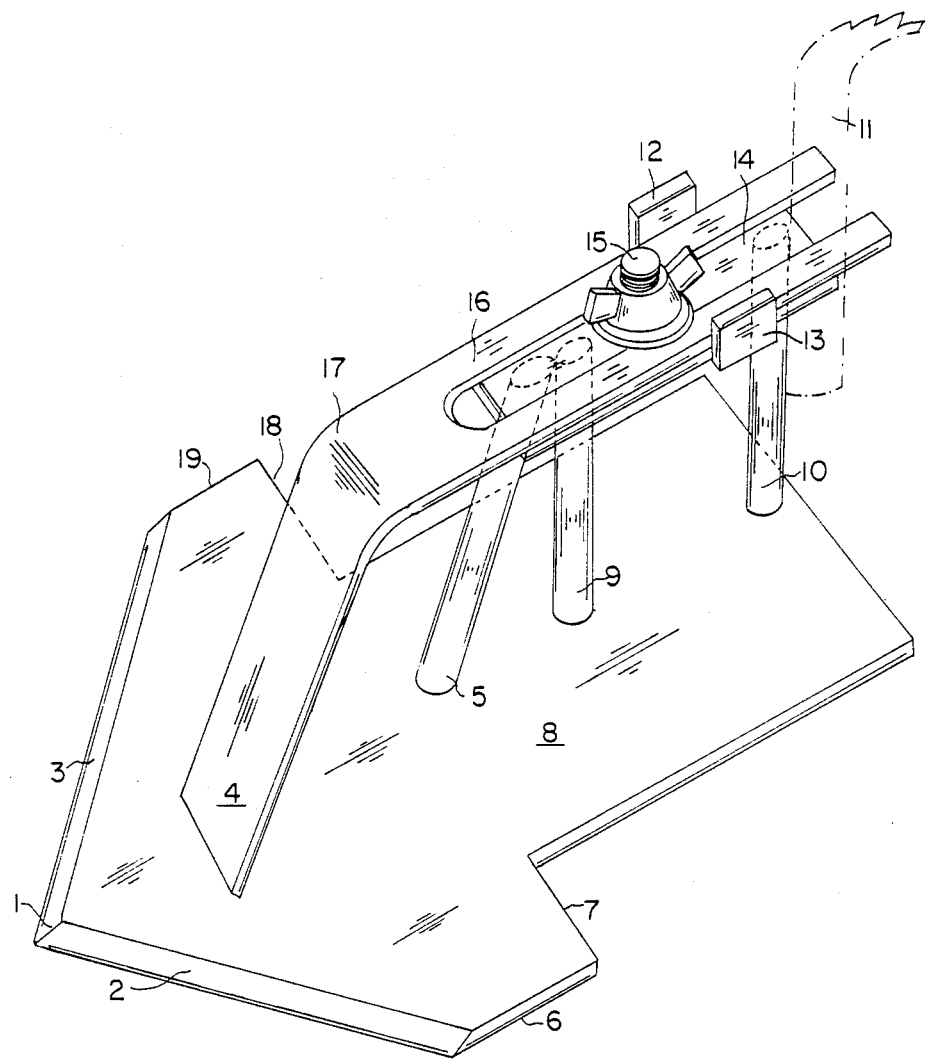
FIG. 3 is an oblique view that displays the operating relationship between the top and bottom sections.

FIG. 3 shows how mild steel strip 4 called a weed displacer is positioned in relation to carbon steel plate 3. The slant at which the weed displacer 4 extend down to plate 3 from bend 17 is steep enough to shove weeds clear of the crumbled soil while crumbling further the already partly crumbled soil when the weed displacer 4 is shoved against it. However, the slant at which weed displacer 4 extends down to plate 3 still allows the crumbled soil to slide up on weed displacer 4 as it is shoved against the crumbled soil, with the soil sliding upward toward the edges of weed displacer 4 and off the edges of weed displacer 4 allowing the weed displacer 4 to slide past the crumbled soil. With the provision that the layer of soil above plate 3 and 6 be thin enough so that the amount of soil to be separated from the weed parts is not too great to be separated from the weed parts by this combination of bottom plate 3 and weed displacer 4. Where no soil is involved, weed displacer 4 shoves weeds cut off flush with the surface of the ground away through a form of chain reaction wherein weeds directly in front of weed displacer 4 are shoved against other cut off weeds, thus also shoving them out of the way. This effect also takes place where a limited amount of crumbled soil is involved.

The disclosure of the invention described hereinabove represents the preferred embodiment of the invention; however, variations thereof, in the form, construction and arrangement of the various sections thereof, and modified application of the invention is possible without departing from the spirit and scope of the appended claims.

I claim:
1. A hand operated weeding device comprising:
 (a) flat stabilizer plate, said stabilizer plate including an upper surface, a forward cutting edge, and a rearward edge opposite to said cutting edge;
 (b) a row of upright rods fixedly attached to the upper surface of said stabilizer plate, said row of rods extending from near said rearward edge forwardly toward but spaced from said cutting edge, the one of said rods nearest said cutting edge being slanted with the top thereof touching the one of said rods next nearest to said cutting edge;
 (c) an elongated handle shank, said shank being fixedly attached to the rearmost one of said rods with an orientation such that the trailing portion of said shank extends upwardly and rearwardly from said stabilizer plate;
 (d) a platform plate fixedly attached to the top of said rods;
 (e) a weed displacer strip mounted on top of said platform plate and extending forwardly and downwardly therefrom so as to touch said upper surface of said stabilizer plate between said cutting edge and said rod nearest said cutting edge, said weed displacer strip adapted to shove weeds away which have been cut by said stabilizer plate as said stabilizer plate is shoved forwardly during the weeding process, said stabilizer plate acting as a self-stabilizer of its operating depth when it is operating in soil.
2. The weeding device of claim 1, wherein said weed displacer strip is adjustably mounted on said platform plate so as to be selectively adjustable in the forward and rearward directions with respect to the said stabilizer plate.

* * * * *